United States Patent
Rahman et al.

(10) Patent No.: US 7,540,664 B2
(45) Date of Patent: *Jun. 2, 2009

(54) GROOVES ON BOTH THE MOVING AND THE STATIONARY MATING FLUID DYNAMIC BEARING SURFACES FOR PERFORMANCE ENHANCEMENT

(75) Inventors: Mohammed Mizanur Rahman, San Jose, CA (US); Klaus Dieter Kloeppel, Watsonville, CA (US); Dustin A. Cochran, Watsonville, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 779 days.

This patent is subject to a terminal disclaimer.

(21) Appl. No.: 11/061,245

(22) Filed: Feb. 18, 2005

(65) Prior Publication Data

US 2005/0135714 A1 Jun. 23, 2005

Related U.S. Application Data

(63) Continuation-in-part of application No. 10/417,721, filed on Apr. 16, 2003, now Pat. No. 7,090,401.

(60) Provisional application No. 60/441,675, filed on Jan. 21, 2003.

(51) Int. Cl.
*F16C 32/06* (2006.01)

(52) U.S. Cl. ..................... 384/123; 384/100

(58) Field of Classification Search .............. 384/100, 384/107–124
See application file for complete search history.

(56) References Cited

U.S. PATENT DOCUMENTS

| | | | | |
|---|---|---|---|---|
| 3,918,773 | A * | 11/1975 | Tuffias | 384/100 |
| 4,934,836 | A * | 6/1990 | Tanaka et al. | 384/100 |
| 5,415,476 | A * | 5/1995 | Onishi | 384/114 |
| 5,675,201 | A * | 10/1997 | Komura et al. | 384/107 |
| 5,908,247 | A * | 6/1999 | Leuthold et al. | 384/107 |
| 6,698,931 | B2 * | 3/2004 | Hino | 384/107 |
| 7,090,401 | B2 * | 8/2006 | Rahman et al. | 384/114 |
| 7,160,031 | B2 * | 1/2007 | Kita et al. | 384/123 |

* cited by examiner

*Primary Examiner*—Thomas R Hannon
(74) *Attorney, Agent, or Firm*—Wax Law Group (57) ABSTRACT

A fluid dynamic bearing is provided having a first surface having at least a first groove pattern formed therein; and the second surface having at least a second groove pattern formed therein; wherein one of the surfaces is configured to be rotated relative to the other surface. The groove patterns may be conventional patterns or patterns described herein. Further, the patterns discussed herein may be disposed wholly on each surface or may be divided between the two surfaces. The groove design is intended to be useable in either a journal, thrust or other fluid bearing design.

17 Claims, 12 Drawing Sheets

GROOVES ON BOTH THE MOVING AND THE STATIONARY MATING FLUID DYNAMIC BEARING SURFACES FOR PERFORMANCE ENHANCEMENT

CROSS REFERENCE TO RELATED APPLICATIONS

This application is a continuation-in-part of U.S. patent application Ser. No. 10/417,721, filed Apr. 16, 2003 by Mohamed Rahman, Gunter Heine, Hans Leuthold and Anthony Aiello, entitled Grooving Pattern for Grooved Fluid Bearing, which claims priority to U.S. Provisional Patent Application Ser. No. 60/441,675, filed Jan. 21, 2003 by the same authors, entitled Grooving Pattern for Grooved Journal Bearing, both of which are herein incorporated by reference.

FIELD OF THE INVENTION

The present invention generally relates to the field of fluid dynamic bearings, and more specifically relates to grooving patterns used in fluid dynamic bearings.

BACKGROUND OF THE INVENTION

Disk drive memory systems have been used in computers for many years for the storage of digital information. Information is recorded on concentric tracks of a magnetic disk medium, the actual information being stored in the form of magnetic transitions within the medium. The disks themselves are rotatably mounted on a spindle. Information is accessed by a read/write transducer located on a pivoting arm that moves radially over the surface of the rotating disk. The read/write head or transducer must be accurately aligned with the storage tracks on the disk to ensure proper reading and writing of information.

During operation, the disks are rotated at very high speeds within an enclosed housing using an electric motor generally located inside a hub or below the disks, for example an in hub or in spindle motor. The spindle includes bearing components to support the rotation and axial location of the disc stack. Such motors may have a spindle mounted by two ball bearing systems to a motor shaft disposed in the center of the hub. However, with the decreasing size of information storage systems, other types of bearings including fluid dynamic bearings are being developed, such as those useful designs discussed herein.

In these types of bearings, a lubricating fluid, i.e., gas, liquid or air is used in the active bearing region to generate fluid dynamic pressure to prevent metal to metal contact.

The bearing region comprises two relatively rotating surfaces, at least one of which supports or has defined thereon pattern of grooves. The grooves collect fluid in the active bearing region. When the two surfaces of the bearing rotate relative to one another, a pressure profile is created in the gap due to hydrodynamic action. This profile establishes a stabilizing force so that the bearing surfaces rotate freely without contact. In a disc drive, the rotating surface is associated with a hub supporting one or more discs whose rotation and axial location is kept stable by the pressure profile.

The tangential forces created in the bearing area characterize the bearing with respect to changes in shear in the fluid and are summed up in torque, which in turn defines power consumption. The pressure profile defines all forces normal to the bearing surface which characterize the bearing with respect to axial load and radial and angular restoring forces and movement.

A specific fluid dynamic bearing design can be characterized by multiple qualities, including power consumption, damping, stiffness, stiffness ratios and restoring forces and moments.

The design of the fluid dynamic bearing and specifically the groove pattern, is adapted to enhance the stiffness and damping of the rotating system, which includes one or more discs rotating at very high speed. Stiffness is the changing force element per changing distance or gap; damping is the change force element per changing rate of distance or gap. Optimizing these measures reduces non-repeatable run out (NRRO), an important measure of disc drive performance.

A further critical issue is the need to maintain the stiffness of the hydrodynamic bearing. The stiffer the bearing, the higher the natural frequencies in the radial and axial direction, so that the more stable is the track of the disc being rotated by a spindle on which reading and writing must occur. Thus the stiffness of the bearing in the absence of any mechanical contact between its relatively rotating parts becomes critical in the design of the bearing so that the rotating load can be stably and accurately supported on the spindle without wobble or tilt.

Figure 2:
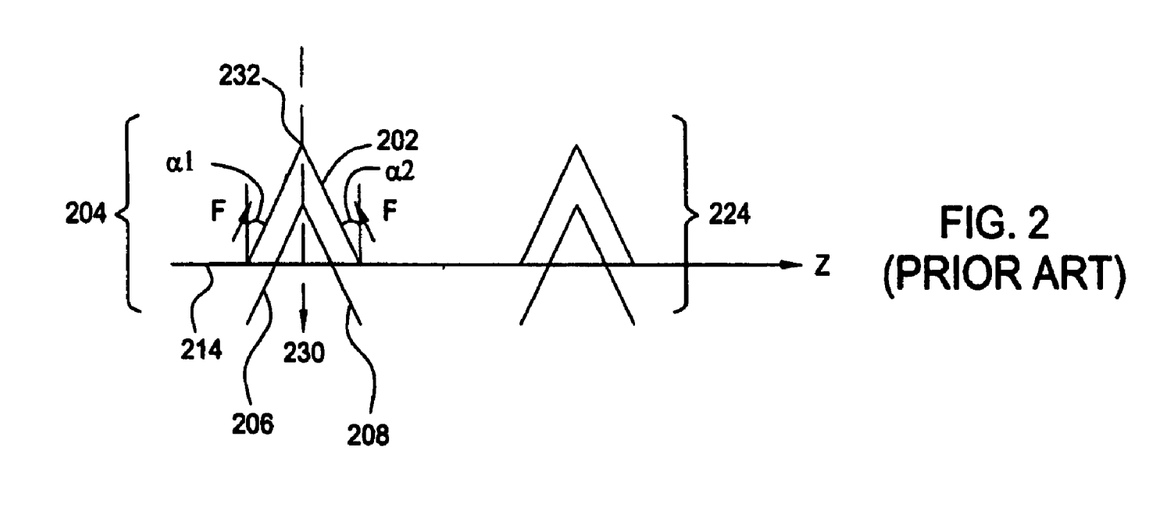
FIGS. 2, 3, 4 & 5 illustrate a first, second, third and fourth conventional grooving pattern used in fluid dynamic bearings.

A typical prior art grooving pattern for fluid dynamic bearings is shown in FIG. 2. A plurality of grooves with constant groove angle along its length can be arranged either on the outer surface of the shaft or on the inner surface of the sleeve. The groove number, angle, groove pitch ratio (GPR), groove depth, etc. can be adjusted to obtain the best stiffness, damping and power to optimize the bearing dynamic performances. However, there are several short comings associated with existing grooving patterns such as that illustrated. For one, fluid flow is mainly limited inside or along the grooves. Second, the grooves do not provide enough restoring moment to protect the bearing from operating shock and impact. Third, the symmetric parts of the grooves are mirror images about their apexes and hence their characteristics are complementary to each other without providing any active control over their performance variations. Fourth, a wide range of pressure fluctuations is generated along a line through the apexes of the successive grooves of a bearing pattern. Fifth, the limited bearing space is not always efficiently used with such grooves to enhance bearing performance. Finally, these grooves require asymmetry to prevent leakage or to have net flow of fluid.

Thus, there is a need in the art for a fluid dynamic bearing grooving pattern that improves one or more of fluid circulation, distribution at the apex and on the bearing surface, restoring moment, control over top and bottom groove sets and pressure fluctuations at the apex. A number of efforts have been made in the prior art to optimize bearing performance by modifying groove depth, width, shape, and/or space. However, it would be advantageous if the different size and shaped grooves could be easily adapted to optimize bearing performances and yet could prevent leakage (in the case of liquids) without requiring asymmetry. This will allow bearings to be spaced apart with longer spans which in turn will increase rocking stiffness and hence restoring moment. It is also desirable to provide additional groove pattern shapes, lengths, and spacing to allow trade-offs between features that qualify a bearing.

Further, in conventional fluid dynamic bearings, the groove pattern is formed on only one of the bearing surfaces to pump fluid and generate pressure. The direction of the grooves will depend on which surface of the bearing they are formed on and the direction of rotor rotation. However, this arrangement does not provide maximized bearing performance. Thus, there exists a need in the art for a fluid dynamic bearing that provides groove patterns on both of the bearing surfaces to generate more pressure and thereby enhance bearing performance.

SUMMARY OF THE INVENTION

An objective of the invention is to provide an improved groove pattern for fluid dynamic bearings.

A related objective is to provide a dynamic bearing grooving pattern that improves one or more of the qualities that measure performance of a fluid dynamic bearing including fluid circulation, distribution of fluids over the bearings surface, restoring moment, and pressure fluctuations at the apex.

A related objective of the invention is to provide for additional or modified pattern shapes, pattern length, and pattern positioning on a surface to allow a designer to more easily make trade-offs between features that qualify a bearing.

In one embodiment, a fluid dynamic bearing having two surfaces rotatable with respect to each other, a lubricating medium located in a gap between the two surfaces during rotation of the bearing, and groove pattern formed in part on each of the two surfaces to distribute the lubricating medium over the surface of the bearing with the patterns being oppositely oriented in the context of relative rotation. The groove design is intended to be useable in either a journal, thrust or other fluid bearing design.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIGS. 6-13 illustrates grooving pattern according to embodiments of the present invention;

DETAILED DESCRIPTION

Figure 1A:
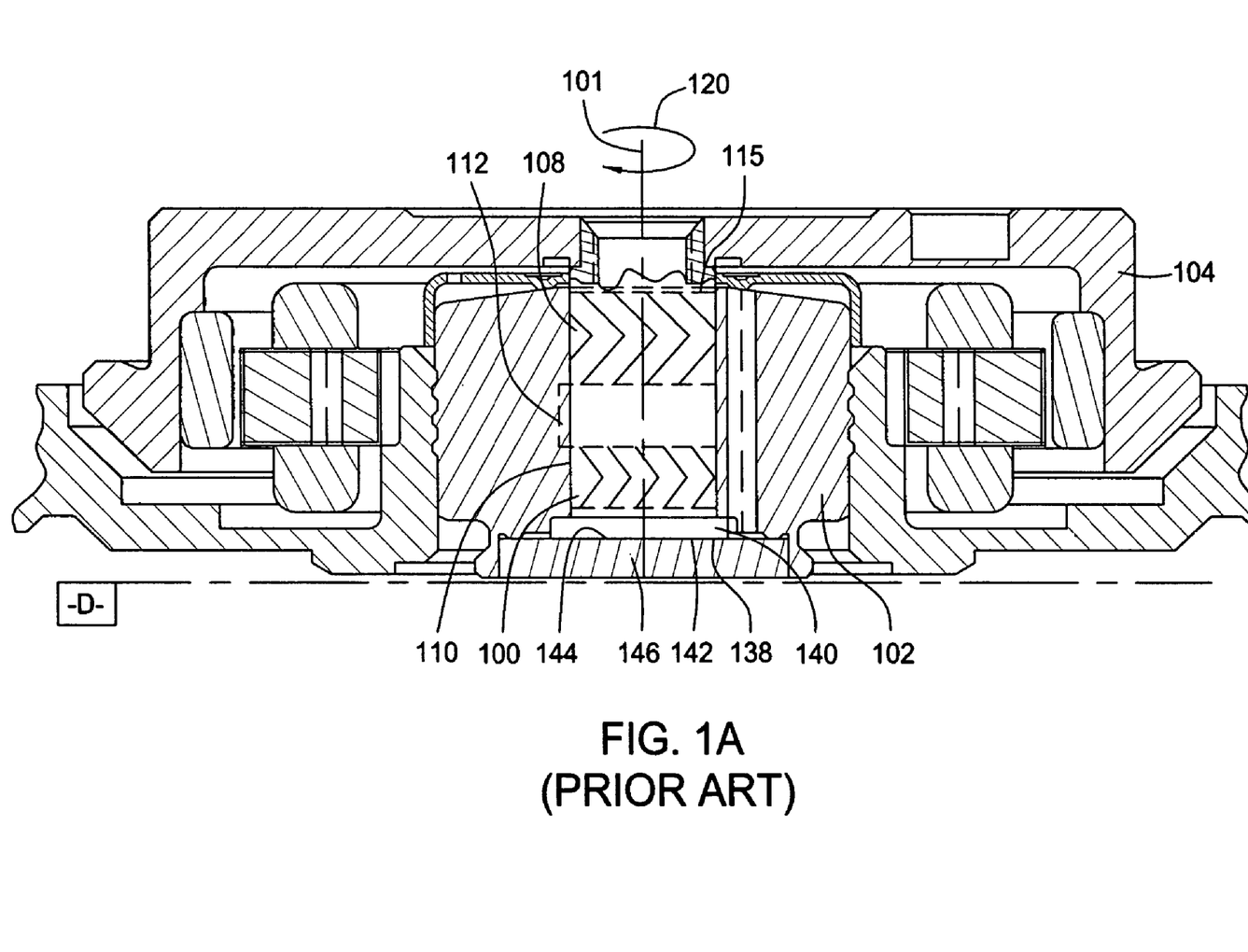
FIGS. 1A and 1B are vertical sectional views of disc drive spindle motors incorporating fluid dynamic bearings in which the embodiments of the present design are useful.
Figure 1B:
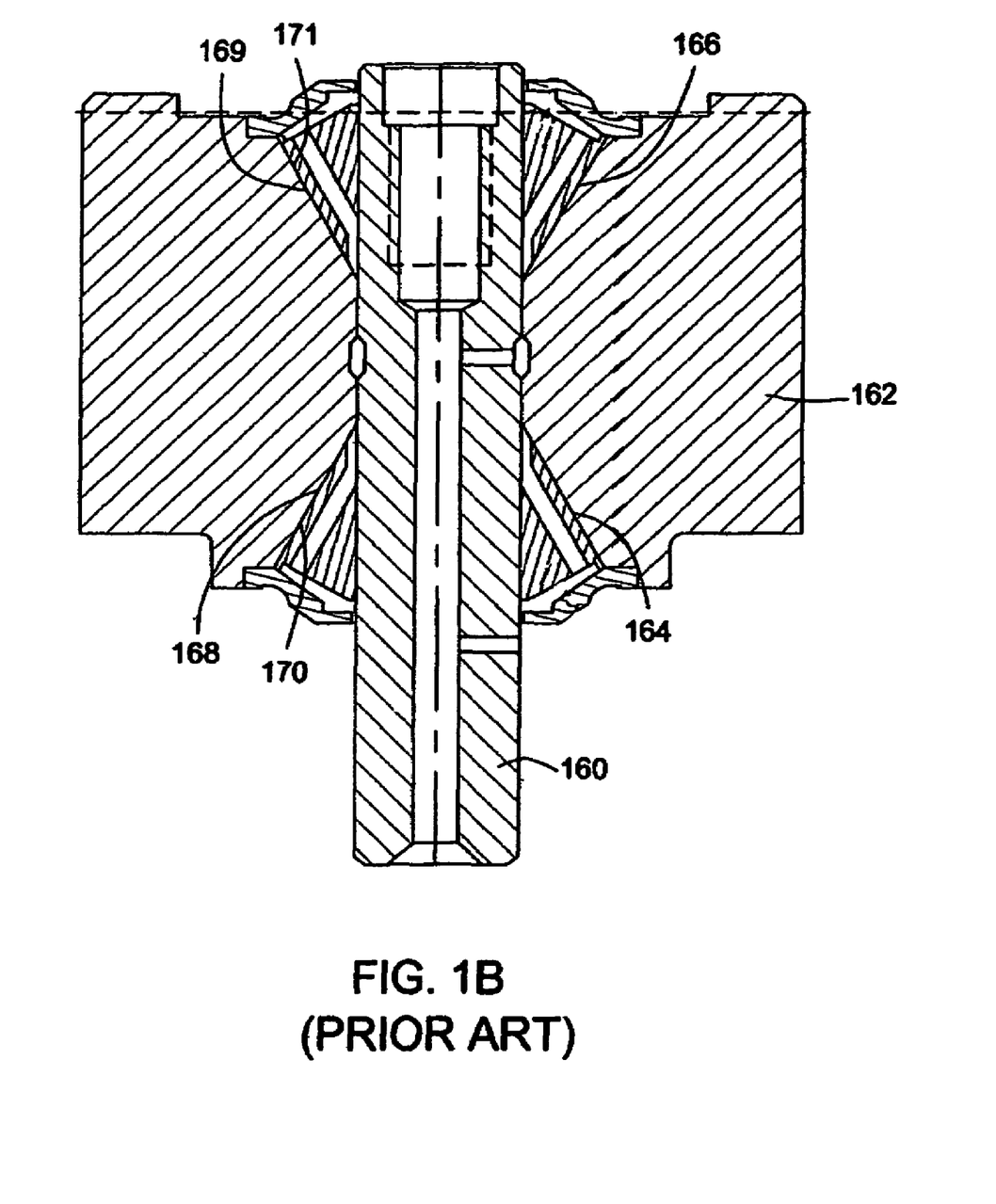

FIGS. 1A and 1B show disc drive spindle motors in which the groove designs of the present invention are useful. However, the grooves to be described below are useful in most, if not all fluid dynamic bearings; they are described herein incorporated in a disc drive spindle motor merely for purposes of illustration.

FIG. 1A is a vertical sectional view of a shaft 100 rotating within a sleeve 102 and supporting a hub 104 for rotation with the shaft. The hub 104 supports one or more discs for rotation within the disc drive. To provide a stable support between the sleeve 102 and shaft 100, fluid dynamic journal bearings 108, 110 are typically provided in the gap 112 between the inner surface of sleeve 102 and the outer surface of shaft 100. An exemplary prior art bearing pattern, similar to the bearing pattern shown in FIG. 2 is shown in the two groove bearing regions 108 and 110 which support the shaft 100 for rotation. The arrow 120 seen at the top of FIG. 1A indicates that the shaft and hub are rotating clockwise in the direction of the arrow. A plurality of grooves 115 of the type shown in any of the figures in this application, but for this example are of the type shown in FIG. 2, are provided in each of the grooved sections 108, 110 to generate hydrodynamic pressure to maintain space between the outer surface of the shaft 100 and the inner surface of the sleeve 102. The grooves 115 may be formed on either surface. The grooves are slanted upward and downward relative to this direction of rotation 120 and their outer ends are directed forward and their inner ends are directed rearward relative to this direction of movement to drive the fluid toward the apex of the groove. As is already known, dynamic pressure is generated in the gap between the surface of the shaft and the surface of the sleeve due to the relative rotary motion between the shaft and sleeve. As the shaft or sleeve moves, in the direction of arrow 120, fluid which exists between the shaft and sleeve flows along each groove in the group of grooves. Thus the grooves both accumulate and retain fluid in the gap between the shaft and the sleeve, and pressurize the fluid to increase the bearing load.

The same design of FIG. 1A also utilizes a thrust bearing 138 defined between an end surface 142 of the plate 140 on the end of shaft 100 and the facing surface 144 of counterplate 146. Grooves may be formed on either surface of the thrust bearing, typically, pumping fluid along the grooves toward the center axis 101. The rotational action of the grooves both accumulates fluid in the grooves and maintains fluid in the gap, and generates the necessary pressure to boost the shaft 100 and surface 142 above the facing surface 144 of the counterplate to allow for free relative rotation without frictional contact.

The grooves on the thrust bearing can also be modified in accordance with the principals of the present invention in order to enhance the stiffness and damping characteristics of the bearing.

FIG. 1B illustrates an alternative design for using fluid bearings to support a shaft and sleeve for relative rotation. According to this design, a shaft 160 is surrounded by a sleeve 162. Bearing grooves are imposed on one surface of gaps 164, 166 defined between facing surfaces 168, 169 of the sleeve and 170, 171 of a cone or sphere. As is known in this field, fluid is maintained in gaps 164, 166 by appropriate design of the grooved pattern which is on one of the surfaces. The grooves provide the functions of both accumulating and maintaining fluid in the gap, and pressurizing fluid in the gaps 164, 166 so that contact does not occur between the cone surfaces 170, 171 and the surrounding sleeve surfaces 168, 169 while relative rotation occurs.

FIGS. 2, 3, 4 & 5 show some of the conventional grooving patterns used in known fluid dynamic bearings. Referring first to FIG. 2, this figure shows a conventional grooving pattern useful in a journal bearing or the like, wherein each groove 202 in the pattern 204 comprises two segments 206, 208. The segments have a constant groove angle relative to the direction of rotation 230 of the shaft of a spindle motor. The two patterns of grooves 204, 224 shown in the FIG. 2 are arranged along the rotational axis 214 to define, in a manner similar to the design shown in FIG. 1A, two journal bearings. The groove segments 206, 208 are slanted upward and downward relative to the direction of relative movement 230 of the bearing part supporting the groove. That is, as discussed above, the outer ends are directed forward and inner ends directed rearward relative to a line 230 representing the direction of movement, so that the grooves will accumulate, retain and pressurize the fluid.

Each groove 202 in each pattern 204, 224 has two segments 206, 208 about the common apex 232. These groove segments have a constant groove angle α1 and α2 along their respective length. Typically the two segments 206, 208 of each groove are mirror images about their common apex 232. During the operation of the bearing, both segments of each groove pump fluid toward the common apex. Because of this, the apex 232 is the highest pressure point. It is also apparent that the grooves of a pattern 204 are regularly spaced along the direction of movement 230 so that the pattern repeats regularly around the entire circumference of the sleeve/shaft gap.

Figure 3:
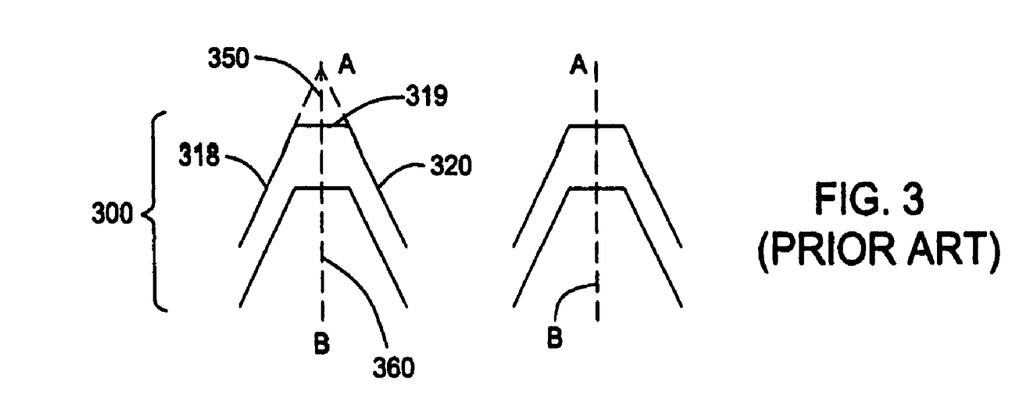
Figure 4:
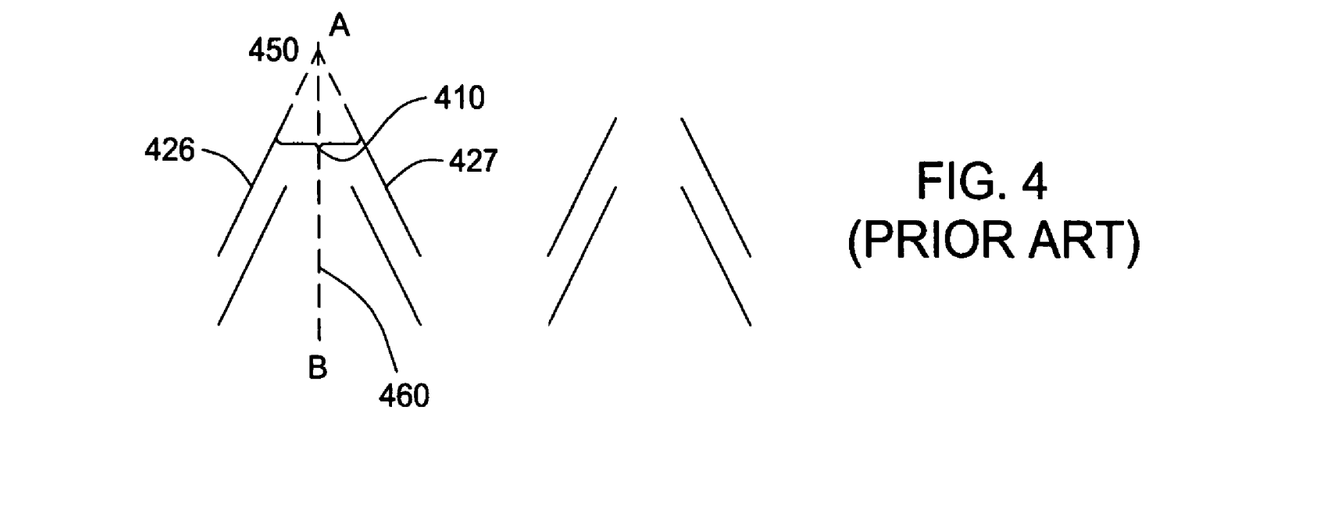

Variations in this constant angled groove design approach are shown in FIGS. 3 and 4. In FIG. 3, each groove in pattern 300 has three segments, 318, 319, 320—each segment with different but constant groove angle along its length. The groove 410 in FIG. 4 has two segments 426, 427 without any common apex. However, in both cases of FIGS. 3 and 4, extending the two corresponding segments of a groove towards the line of symmetry, A-B 360, 460 will cause them to converge at a common apex 350 or 450 (virtual apex).

Figure 5:
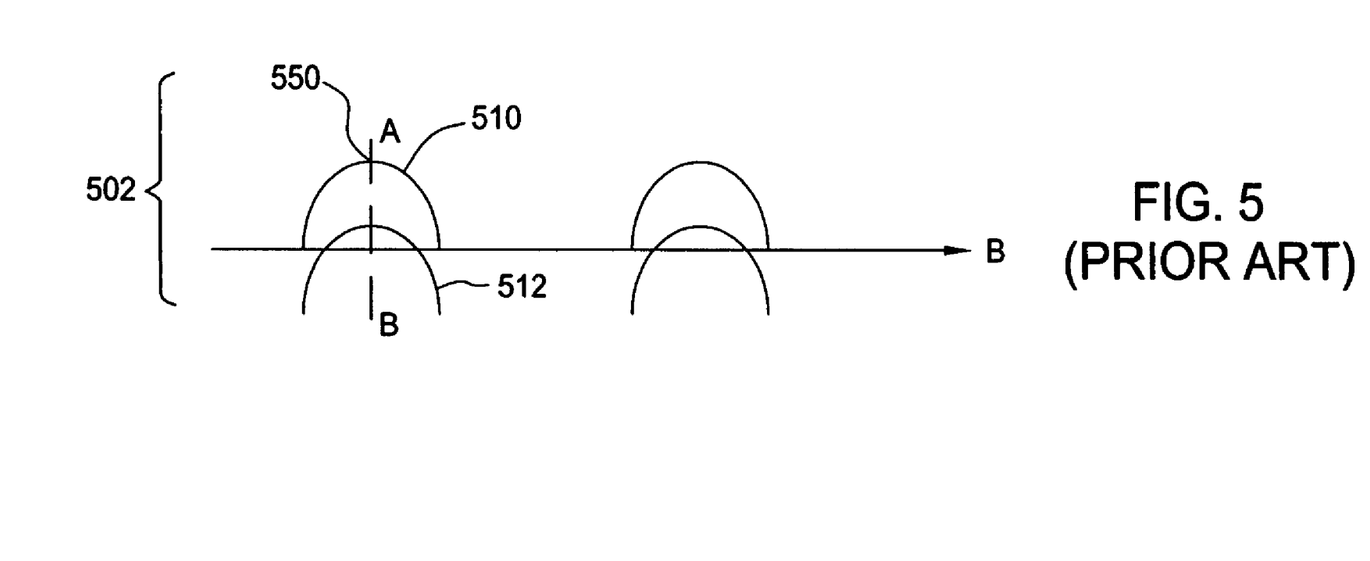

FIG. 5 illustrates another type of groove which has many of the same characteristics as described above except that the grooves 510, 512 of pattern 502 have a continuously varying angle (in this particular case a sinusoidal groove) along at least part of their length. In all these grooves as described above, if the grooves are symmetric about their apex (or virtual apex), the net pumping in any direction would be zero. To cause a net pumping in any one direction, one of the segments has to be longer, or larger in cross section. In all of these known designs, tradeoffs have to be made which optimize some measurements of performance while diminishing others. Therefore the groove designs of this invention shown in the following Figures, have been adopted.

The grooving patterns of the present invention may be advantageously employed on the bearing surfaces of fluid bearings shown in the following Figures; the invention is not limited to these motor designs. In a journal bearing, grooves may be formed on the outer surface of the shaft, the inner surface of the sleeve or part of each surface. They also may be used on thrust bearing surfaces, either on the thrust plate or counterplate; or on either surface of a conical or spherical bearing. The figures that follow illustrate a plurality of exemplary grooving patterns based on the design principals of the present invention.

Figure 6A:
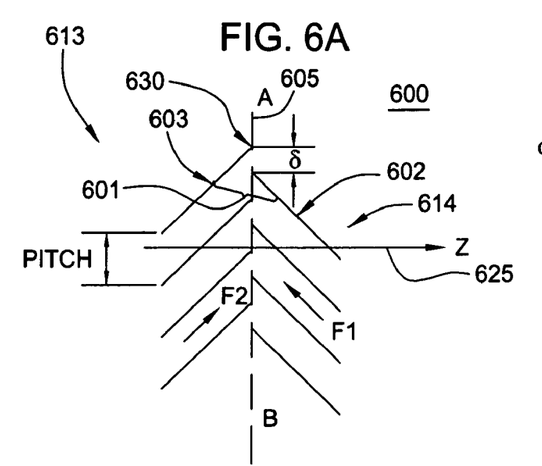
FIGS. 6A, 6B, 7A and 7B illustrate alternate approaches to implementing a groove pattern.

FIG. 6 illustrates a pattern of grooves 600 which may be formed on a shaft or sleeve for generating dynamic pressure in the gap between the shaft and sleeve. The grooves are arranged along a line 605 representing the direction of rotation of the surface on which they are arranged, and are side by side in the direction of rotation 605 at substantially equal intervals. Each groove includes a pair of segments 602, 603 which are interrupted and offset relative to each other along the direction of rotation. That is, rather than meeting at a defined apex and forming a continuous groove, the segments 602, 603 of each groove 601 are offset along the direction of rotation 605 with respect to each other. Thus, if the ends of the segments 602, 603 were extended, those ends would not meet at a virtual apex on a line of symmetry as is typical of the prior art. The pattern of grooves 600 shown in FIG. 6 extends entirely around the shaft or sleeve in the direction of rotation, and typically comprises two sets 613, 614 of equal numbers of groove segments, forming groove pattern 600. It can be seen that at least part of each of the offset segments 602, 603 of each groove is on either side of the apex (point of highest pressure) of a pressure profile representing the pressure distribution axially across the groove pattern in the direction of the axis of rotation 625. So as the shaft or sleeve rotates, fluid which exists or is being supplied into the gap between the shaft and the sleeve flows along the groove segments to generate dynamic pressure between the shaft and sleeve. The fluid thereby pressurized is retained in the groove segments 602, 603. This optimizes the desired performance characteristics of a fluid bearing as will be explained in further detail below. The offset amount δ between the ends of the two segments 602, 603 of a groove 601 is preferably 0<δ≦0.5*pitch.

This design and the designs in the Figures to follow utilizing offset groove segments is advantageous for several reasons. First, when the grooves are continuous (such as those shown in FIG. 2) fluid flows inside or along the grooves (see arrow F in FIG. 2), so fluid circulation or distribution on the bearing surface is limited. The offset pattern 600 illustrated in FIG. 6 accomplishes better fluid circulation at each groove apex 630 and on the active bearing surfaces, because fluid is pumped in opposing directions (see arrows $F_1$ and $F_2$) towards the area where the grooves are interrupted and offset, and thrown vigorously over the opposing bearing groove surfaces where the lubricating fluid may mix thoroughly.

Second, the offset and interrupted pattern 600 provides a better restoring moment to the bearings (during operating shock) than does the conventional symmetrical pattern with segments having constant groove angles (such as illustrated in FIG. 2). Third, continuous grooves such as those shown in FIGS. 2-5 are symmetric about their apexes (or virtual apex), and hence their characteristics are complementary to each other; that is, whatever happens on one side of the apex happens on the other side as well. Thus it is difficult to establish a net pumping direction for any one set of symmetric grooves. However, an offset pattern such as that illustrated in FIG. 6, where the two segments 602, 603 of the pattern are not necessarily mirror images because of offset (groove ends do not meet at common apexes along a line of symmetry when extended) and the pattern is not continuous, makes it possible to use different groove patterns for each segment (see e.g. segments 1203 and 1204 of pattern 1200 in FIG. 12, and segments 1303 and 1304 of pattern 1300 in FIG. 13). This flexibility in groove design allows better control over bearing performance optimization than does a conventional design.

Fourth, conventional designs such as those illustrated in FIGS. 2-5 create a wide range of pressure fluctuations at the various groove apexes along the line A-B drawn in the direction of travel through apexes 232, 350, 450 and 550. Use of the offset design illustrated in FIG. 6 and the following Figures creates a pressure distribution that is far less dramatic, with the differences in pressure along the various apexes of parallel grooves in a pattern being much smaller than in conventional designs.

Figure 6B:
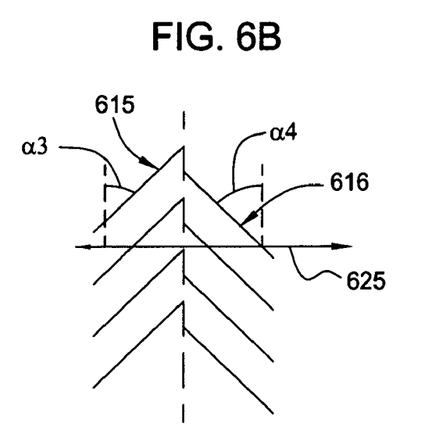
Figure 12:
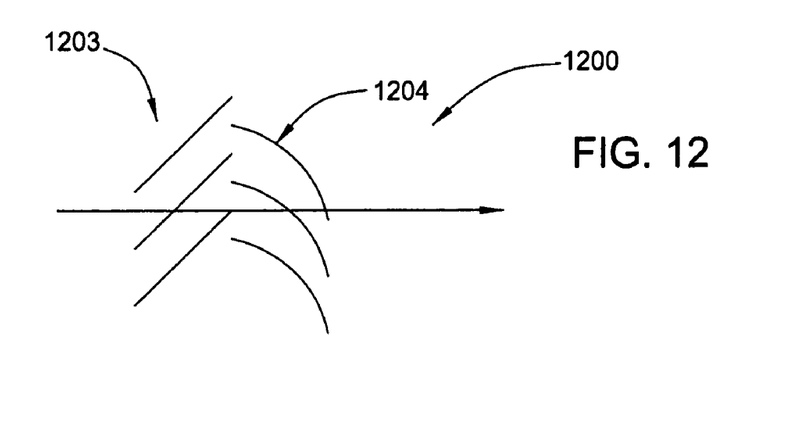
FIGS. 12, 13A & 13B illustrate alternate approaches to embodying a further groove pattern.
Figure 13A:
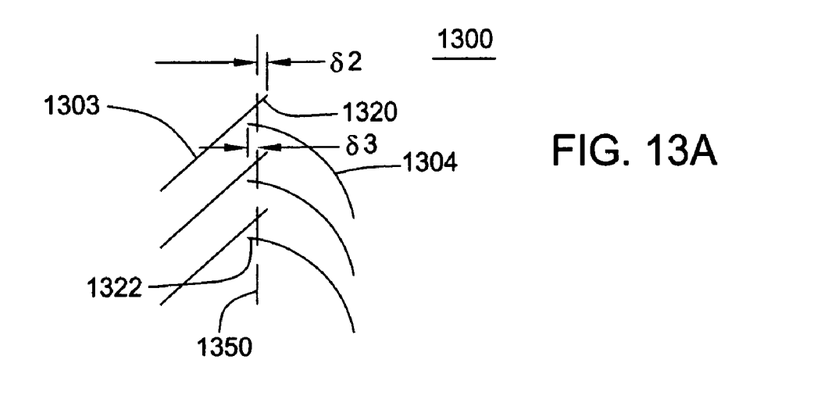

Fifth, because the space available for fluid bearings is limited, the performance of continuous grooves may be limited as well. In a fluid bearing with offset groove pattern, the available bearing space is more efficiently used compared to the conventional continuous groove pattern. Since only the symmetric part of continuous grooves contribute to the bearing performance i.e. to enhance the stiffness, any unsymmetric part is used only to seal the bearing and retain the fluid within the bearing. Much of the axial length is a waste of bearing space from a bearing dynamic performance point of view. In a bearing with offset grooves, the sealing of lubricant can be achieved by using different kinds of grooves about the apex with different pumping capacity without any groove asymmetry. For example, (see FIG. 6B) one set of offset groove pattern segments 615 can be of constant groove angle α3 and the other set 616 can have the same type of groove but with different groove angle α4 to have different pumping capacity. The combined result is a net pumping effect in the direction of choice along axis 625 without adding or wasting any bearing space for an unsymmetric groove section which otherwise would have to be used with symmetric grooves. The same effects can also be achieved by using two sets of groove segments with different features as shown in FIGS. 12 and 13, the sets of segments being arranged in an offset pattern as described above. Hence the available bearing space is more efficiently used with an offset groove pattern. Since in a bearing with an offset groove pattern, symmetric grooves do not have to be used, the bearing viscous power can be better optimized as well.

Figure 7A:
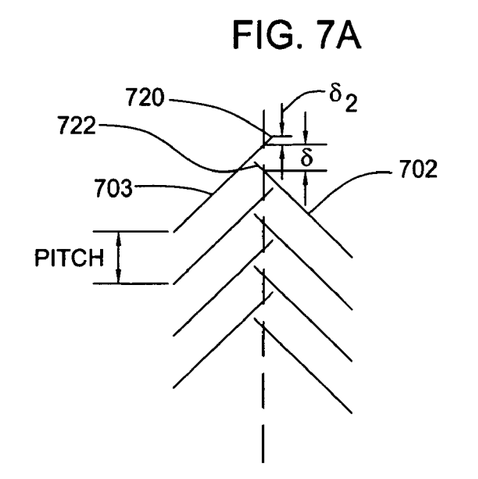
Figure 7B:
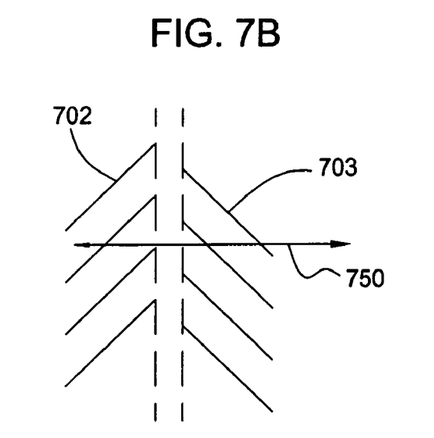

In an optional embodiment, the ends 720, 722 of the segments 702, 703, respectively, may even optionally extend past the end of the opposing offset groove (δ2>0) as shown in FIG. 7A so that the segments of a groove overlap in the direction of rotation. Alternatively, the sets of offset groove segments 702, 703 may be spatially separated (see FIG. 7B) along the axis of rotation 750 to enhance selected performance criteria.

Figure 8:
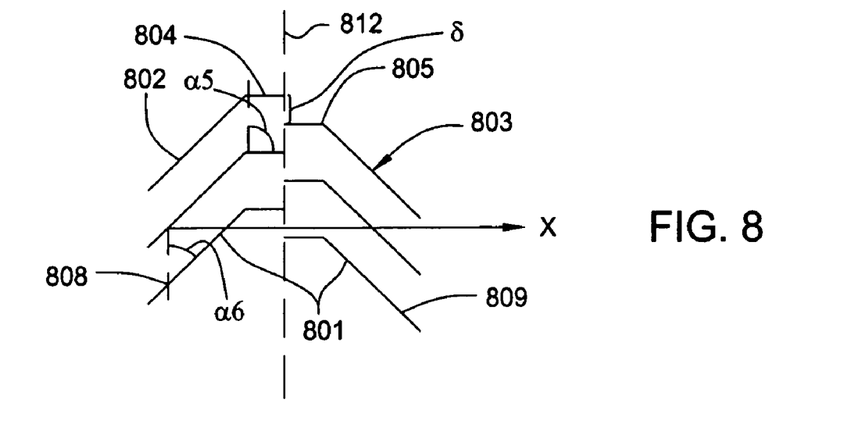
FIGS. 8, 9A & 9B illustrate further alternate approaches to implementing a groove pattern.
Figure 9A:
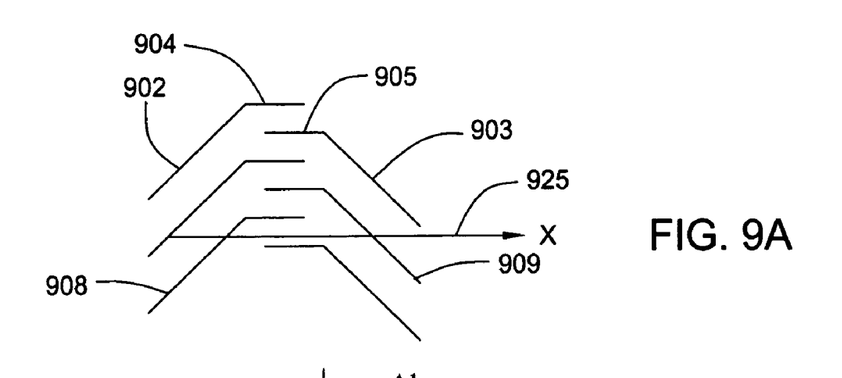
Figure 9B:
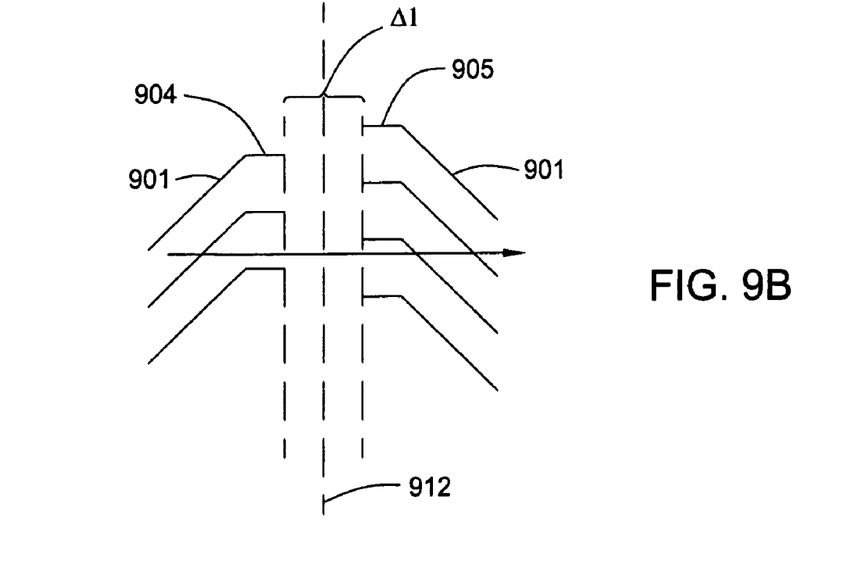

FIGS. 8, 9A and 9B show other embodiments of an alternate and offset grooves where the groove segments have constant groove angle. These grooves are modifications of continuous grooves such as shown in FIG. 3. The groove segments 802, 803, 902, 903 each include a first section 804, 805, 904, 905 which is at an angle α5 with the direction of rotation 812; these sections are fluidly connected to sections 808, 809, 908, 909 which are at a different angle α6 to the direction of rotation 812. As in FIG. 6, the offset amount δ between the ends of any two segments 804, 805 of a groove 801 is preferably 0<δ≦0.5pitch.

A variation is shown in FIG. 9A, where the sections 904, 905 are extended in the direction of the axis of rotation 925 so that they overlap in the direction of rotation. Testing indicates that when the overlap sections extend axially past the apex of a pressure profile drawn along the groove pattern, the effective pressurization of the fluid increases while maintaining the stability of the rotating system (as will be discussed below with respect to FIGS. 14 and 15). It is also possible to axially separate (Δ1) the sections 904, 905 in the direction of rotation 912 as shown in FIG. 9B, while maintaining the offset of segments 904, 905 of each groove 901.

Figure 10:
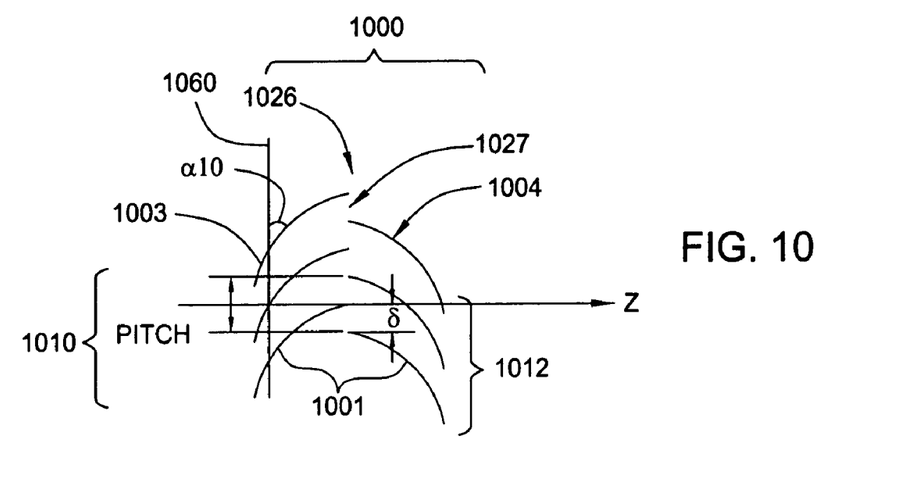
FIGS. 10, 11A and 11B illustrate alternate approaches to embodying another groove pattern.
Figure 11A:
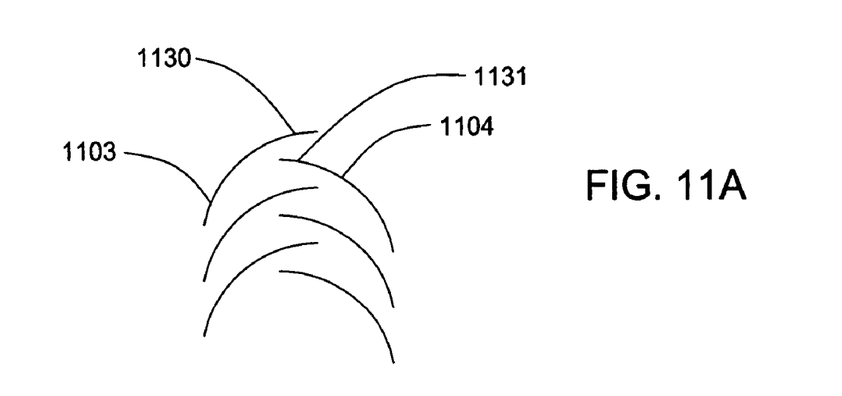
Figure 11B:
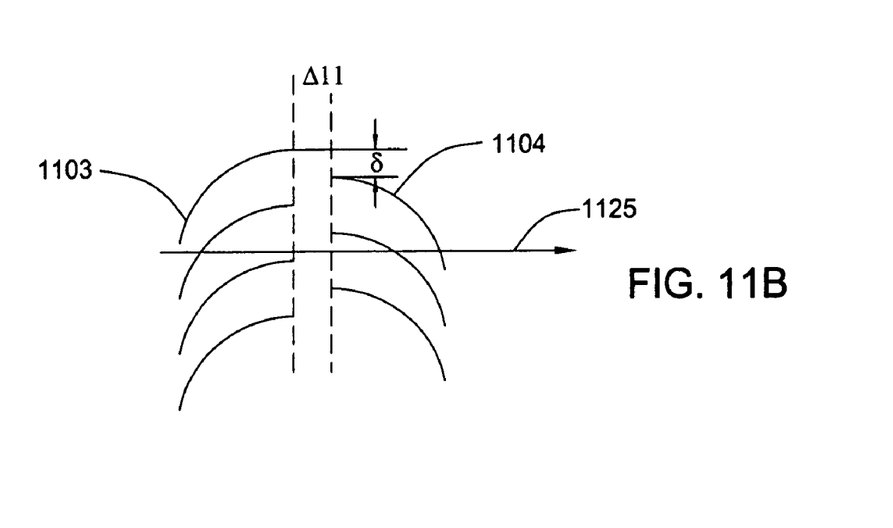

FIGS. 10, 11A and 11B illustrate embodiments of interrupted and offset grooves where the angle of the groove segments vary continuously along at least part of each groove section. The shape of the groove segment could be part sinusoidal, elliptical or any other curve where the groove angle α10 measured against the direction of rotation represented by line 1060 varies continuously along their lengths. The sinusoidal pattern shown in FIG. 5, is prone to many shortcomings (for example, limited fluid flow patterns and limited flexibility in groove geometry). These shortcomings are addressed by this embodiment of an alternate or offset grooving pattern 1000 as illustrated in FIGS. 10, 11A & 11B. Each groove 1001 in the grooving pattern 1000 of FIG. 10 features a first segment 1003 and a second segment 1004 that are offset relative to each other along the direction of rotation of the groove pattern—that is, rather than meeting to form a closed, continuous curve, the segments 1003, 1004 of each groove 1001 form a pattern 1000 wherein each segment in the set 1010 is offset from an associated segment in set 1012 by δ (preferably 0<δ≦0.5* pitch). The segments 1003, 1004 of each groove 1001 are oriented so that if, for example, the segments 1003 and 1004 are extended axially following the curvature of the segment, the end 1026 of first segment 1003 would not meet the end 1027 of the second segment 1004 to form a closed, continuous curve.

Other embodiments of a groove shape with interrupted and offset segments, each having a continuously varying angle are shown in FIGS. 11A and 11B. This embodies the principles expressed with respect to FIG. 10 and the preceding Figures, except that in FIG. 11A the end portions 1130, 1131 of each segment 1103, 1104 of a groove extend past the end of the axially opposing groove segment; the segments overlap in the direction of rotation to further enhance the qualities of fluid retention and pressurization. FIG. 11B is a further alternative to FIG. 10; in this Figure, the segments 1103, 1104 are axially separated along the axis of rotation 1125 by a distance Δ11. In this embodiment, preferably 0≦δ≦0.5*pitch.

Figure 13B:
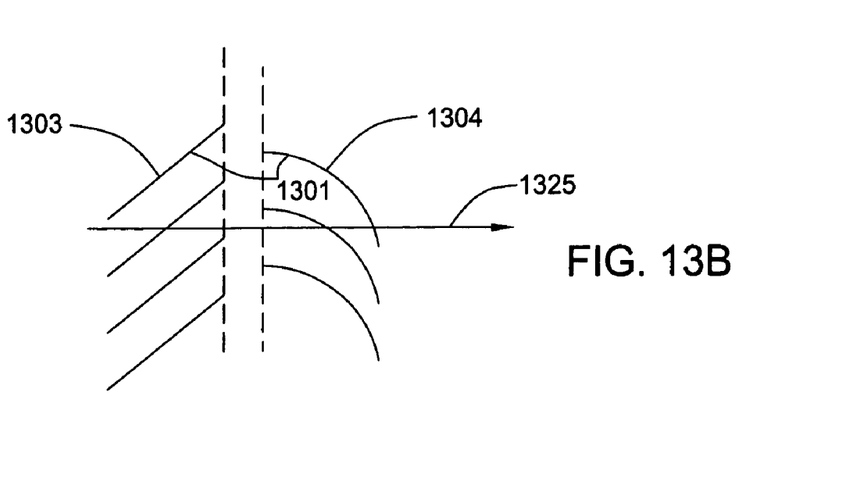

FIGS. 12, 13A and 13B illustrate other embodiments of groove patterns with offset segments. Groove pattern 1200 of FIG. 12 is formed by the combination of two different groove segment geometries—in these examples, one segment 1203 having a constant groove angle and the other segment 1204 having a continuously varying groove angle. In a groove pattern like this, the two groove segments can have different groove length, groove pitch ratio (GPR), groove depth, groove shape (cross section) as needed to optimize the bearing dynamic performance and to influence a net pumping in any direction if so desired to enhance fluid retention or to enhance recirculation. As in FIG. 6, the offset amount δ between the ends of any two segments 804, 805 of a groove 801 is preferably 0<δ≦0.5*pitch.

FIG. 13A illustrates that the end sections 1320, 1322 of segments 1303, 1304 can extend axially past the other segment of a groove by distances δ2, δ3, further enhancing bearing performance in a manner not possible with the prior art. In this example, the overlap section δ2, δ3 may be measured from the virtual apex 1350 of a pressure profile of pattern 1300. Also, in the embodiment of FIG. 13A, where the curved segment 1304 is extended, the extension 1322 may continue the same curved path or may be straight.

FIG. 13B illustrates that the segments 1303 and 1304 of a groove 1301 can be axially separated; in such a design, either segment or neither segment may reach the apex of a pressure profile drawn axially along the axis 1325 of rotation.

Figure 14:
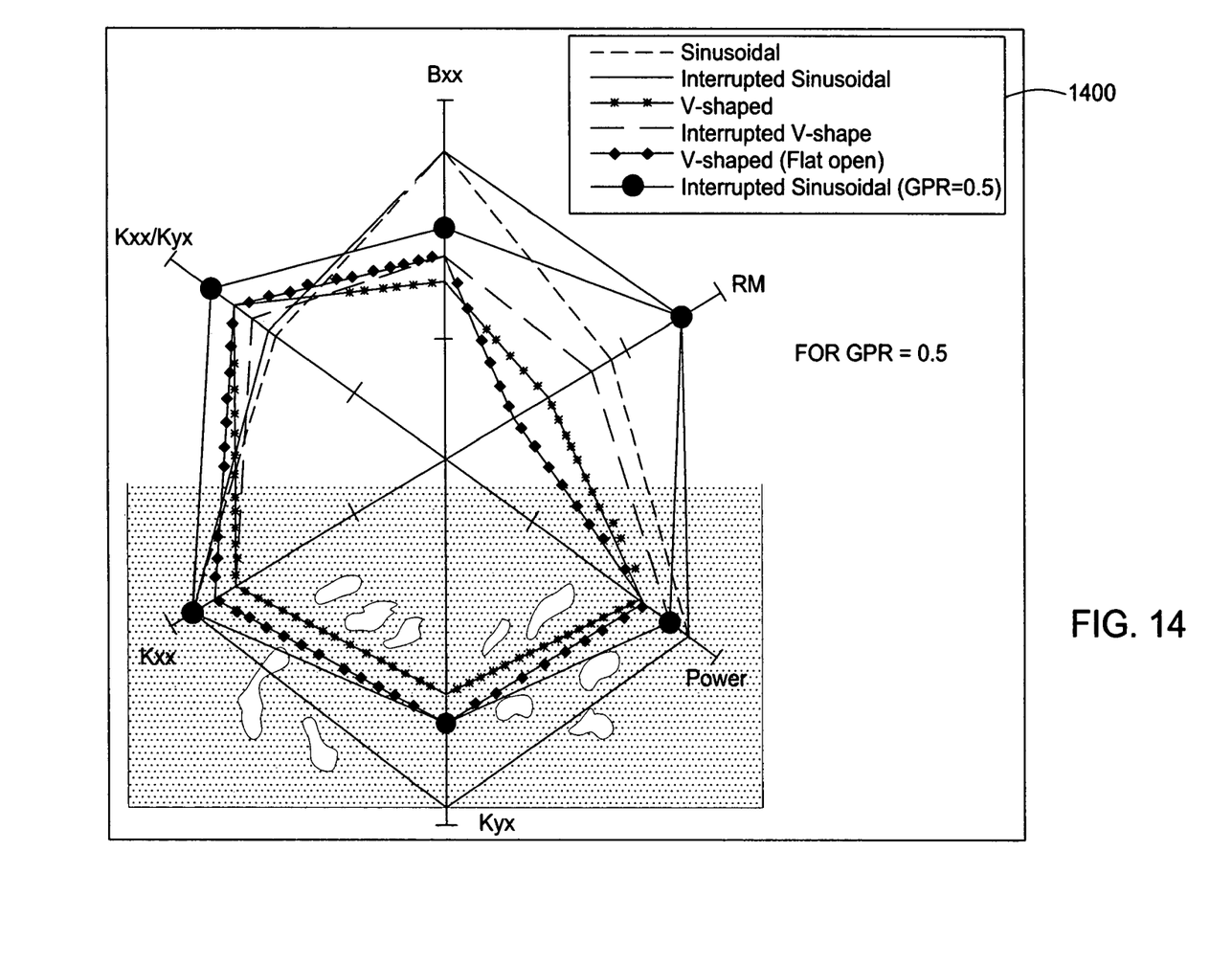
FIG. 14 is a web diagram illustrating the comparative advantages of various grooving patterns, including embodiments of the present invention.
Figure 15:
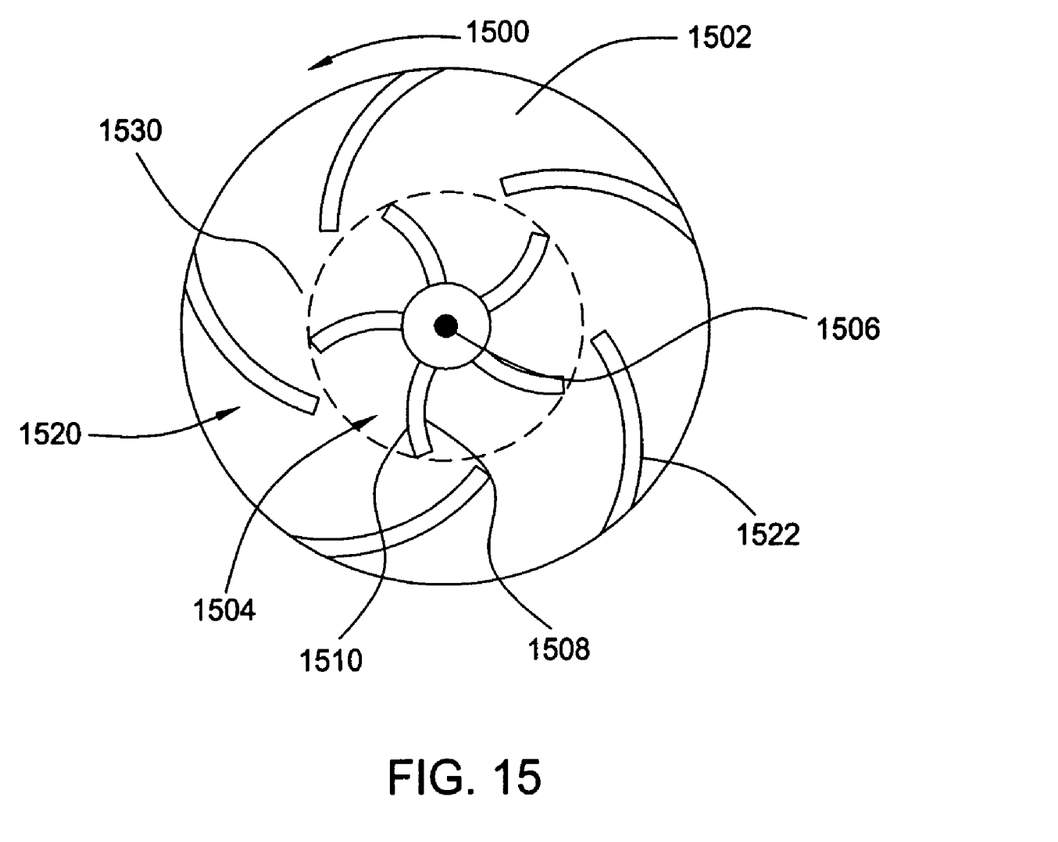
FIG. 15 illustrates application of the grooving principles of the invention to a thrust bearing.

The advantages of the illustrated embodiments of the present invention may best be understood with reference to FIGS. 14 & 15. FIG. 14 is a web diagram illustrating the performance of several bearing groove patterns, including conventional patterns and alternate embodiments discussed herein. The key identifies markings for the following groove patterns, all of which are evaluated at a groove pitch ratio (GPR) of 0.5. Note that the GPR for continuously varying groove are taken at their ends, since GPR may not be constant along its length of adjacent grooves.

FIG. 14 compares bearing groove performance according to several criteria. The Bxx axis measures radial damping, which is a desirable effect, therefore the larger the value along the Bxx axis, the better. RM is the restoring moment provided by the bearings to the system under operating shock and gyroscopic loading, which is also desirable, and therefore the greater the restoring moment value, the better it is. The power axis measures the power consumption of a fluid dynamic bearing motor utilizing a given bearing groove design, and therefore this value is preferably low. Kyx is cross stiffness, which creates a tendency to destabilize the bearing assembly by forcing the position of the motor shaft into misalignment (i.e. sideways, away from the center of the motor), therefore, cross stiffness is preferably kept to a minimum. Kxx, however, is inline radial stiffness, to maintain the central alignment of the shaft; therefore, the larger Kxx is, the better. And furthermore, a larger value for Kxx will imply a larger value for the ratio of Kxx/Kyx, which is also preferably large because a Kxx that is larger than Kyx will ensure greater stability of the motor.

It can be appreciated from studying FIG. 14 that overall, the offset grooves with segments having constant but different groove angles and offset grooves with continuously varying angle patterns disclosed herein are characterized by superior performance when compared to conventional bearing grooving patterns.

FIG. 15 shows the application of the principles described above to a thrust bearing. In this embodiment, the two segments of a single groove can be arranged offset to each other instead of having a common apex where they are joined together. Assume a direction of rotation 1500 for the thrust bearing surface 1502. The surface 1502 has defined thereon a first set of groove segments 1504 which begin at or near the center axis 1506. Each groove segment 1504 has leading and trailing edges 1508, 1510 that form smooth curves, and the groove segments extend partially across the surface 1502. A second set of groove segments 1520 begins at or near the outer edge 1522 of the thrust surface 1502. The second set of groove segments 1520 extends radially and angularly and across the surface 1502 and each segment 1520 is typically curved relative to the direction of rotation 1500 with a radius of curvature opposed to the groove set 1504. Typically each groove segment of grooves 1504, 1520 extends up to or slightly across an annular boundary 1530 which represents the apex of a pressure profile as measured radially across the surface 1502 and represents the ability of the groove pattern to pressurize fluid in the gap between the surface shown and a facing surface, as described above with respect to FIGS. 6A through 13B. Various patterns may be used, comprising straight or curved shapes which may overlap each other in the direction of rotation, or be radially separated, as described.

The patterns of the FIGS. 6A-13B may also be applied to conical or spherical surfaces, in accordance with the above teachings.

Thus the present invention represents a significant advancement in the field of fluid dynamic bearing design. Offset grooving patterns enhance fluid re-circulation, distribution and net flow without groove asymmetry. Pressure variations across the bearings are significantly reduced, while restoring moment is increased. Furthermore, the patterns disclosed are more easily adaptable to the limited space available for bearings. The use of interrupted and offset groove patterns also allows the patterns to appear on both the stationary and moving surfaces of a bearing. That is, one set of interrupted and offset grooves are defined on a stationary surface such as the inner surface of sleeve 102; the other set would be defined on the rotating surface such as the outer surface of shaft 100.

It should be noted that when the grooves (which can take many different forms as explained below) are on opposite surfaces as they are in the embodiments below, they are oppositely oriented in the context of relative rotation. This orientation is desirable to optimize the pressure build-up between the surfaces that supports the relative rotation o the surfaces. The design utilizing cooperating groove patterns on facing surfaces may also maintain and improve distribution of fluid over the facing surfaces and restoring moment, and/or minimize pressure fluctuations at the apex. A number of exemplary embodiments utilizing groove patterns on both stationary and moving surfaces will be described below. These patterns include both the interrupted and offset patterns described at length above as well as other known patterns.

Figure 16A:
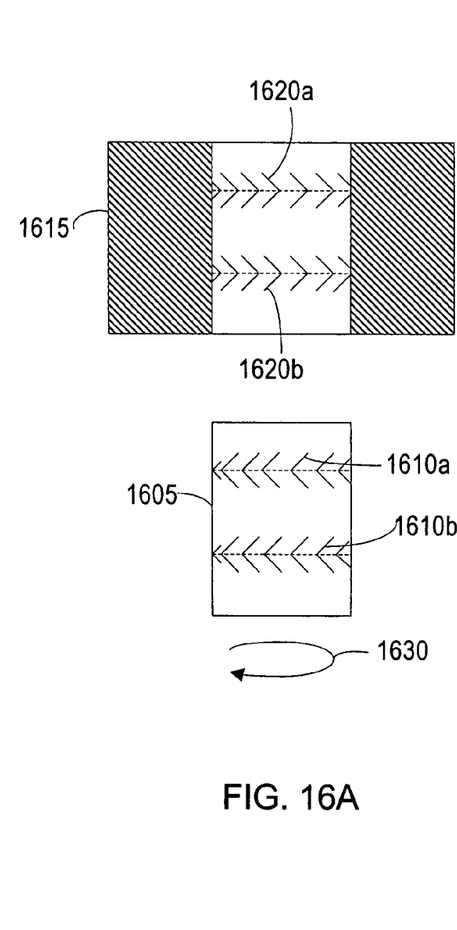
FIGS. 16A-C are exploded assembly drawings of a simplified shaft/sleeve assembly illustrating embodiments of the present invention.
Figure 16B:
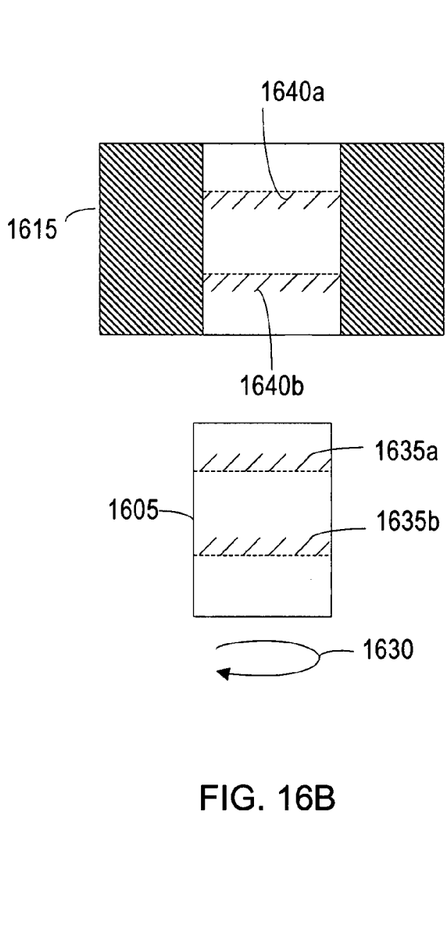
Figure 16C:
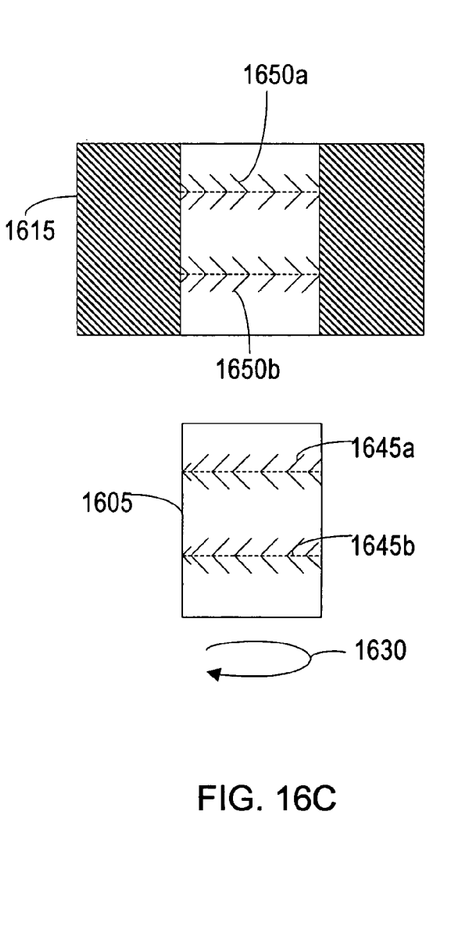

FIGS. 16A-16C are exploded assembly drawings of a simplified shaft/sleeve assembly illustrating embodiments of the present invention. These Figures illustrate examples of this concept in the context of journal bearings. It can be seen that as this shaft 1605 and sleeve 1615 are in relative rotation, the grooves are effectively opposite in orientation, producing the desired pressure between the surfaces. In each of the Figures, a side view of a simplified shaft 1605 is provided. Disposed on the shaft 1605 are two groove patterns 1610a,b (FIG. 16A), 1635a,b (FIG. 16B) or 1645a,b (FIG. 16C). The shaft 1605 is configured to be disposed and rotate in a stationary sleeve 1615, which is shown in section. Alternatively, the sleeve 1615 may rotate about the shaft 1605. Disposed on an inside surface of the sleeve 1615 are two groove patterns 1620a,b (FIG. 16A), 1640a,b (FIG. 16B) or 1650a,b (FIG. 16C). In one embodiment, the shaft 1605 and sleeve 1615 may represent the shaft 100 and sleeve 102 of FIG. 1A. The groove patterns 1610a,b; 1620a,b; 1635a,b; 1640a,b; 1645a,b; and 1650a,b are oriented for the shaft 1605 to rotate in a clockwise direction as indicated by arrow 1630.

Referring to FIG. 16A, the groove patterns 1610a,b of the shaft 1605 correspond to the groove patterns 1620a,b of the sleeve 1615, respectively and are conventional chevron grooves. Alternatively, any of the conventional groove patterns illustrated in FIGS. 3-5 may be used. Groove patterns 1610a,b are identical and groove patterns 1620a,b are also identical. Alternatively, the groove patterns 1610a, 1620a may be configured differently than groove patterns 1610b, 1620b, respectively. For example, segments of the groove patterns 1610a, 1620a may be longer than segments of the groove patterns 1610b, 1620b to provide a net pumping pressure toward one end of the shaft as are the grooves 115 in the grooved section 108 as compared with the grooves 115 in the grooved section 110 in FIG. 1A.

Referring to FIG. 16B, the groove patterns 1635a,b of the shaft 1605 correspond to the groove patterns 1640a,b of the sleeve 1615, respectively. One set of segments 602,603 (see FIG. 6A) has been used for the groove patterns 1635a,b and the other set of segments 602,603 has been used for groove patterns 1640a,b. Alternatively, any of the groove patterns displayed in FIGS. 6B-13B may be used in a similar manner by locating one set of segments on the shaft and the other set of segments on the sleeve. The sets of segments of a pattern preferably are oppositely oriented to optimize pressure build-up. Although groove patterns 1635a,b are identical and groove patterns 1640a,b are identical, they may be configured differently.

Referring to FIG. 16C, the groove patterns 1645a,b of the shaft 1605 correspond to the groove patterns 1650a,b of the sleeve 1615, respectively. In contrast to FIG. 16B, both segments 602,603 are used for groove patterns 1645a,b and both segments 602,603 are used for groove patterns 1650a,b, instead of dividing the segments up between the patterns. Again, any of the groove patterns displayed in FIGS. 6B-13B may be used in a similar manner. Again, even though groove patterns 1645*a,b* are identical and 1650*a,b* are identical as shown, they may be configured differently.

As discussed earlier, it is preferred that segments comprising groove patterns 1610*a,b*; 1620*a,b*; 1635*a,b*; 1640*a,b*; 1645*a,b*; and 1650*a,b* be oriented such that outer ends of the segments comprising the groove patterns be directed forward and their inner ends be directed rearward relative to a direction of rotation. For the stationary sleeve 1615, this is accomplished by treating the sleeve as if it were rotating in a direction opposite to the rotating shaft 1605, since this is the direction of the sleeve's relative rotation to that of the shaft. However, a reverse orientation would still fall within the scope of the invention. In all the embodiments using the groove patterns of FIGS. 6 thru 16A-C, the patterns on shaft and sleeve need to be configured such that they are oppositely oriented with respect to one another when the shaft and sleeve rotate relative to one another.

The patterns of the FIGS. 16A-C may also be applied to conical or spherical surfaces, in accordance with the above teachings.

Figure 17A:
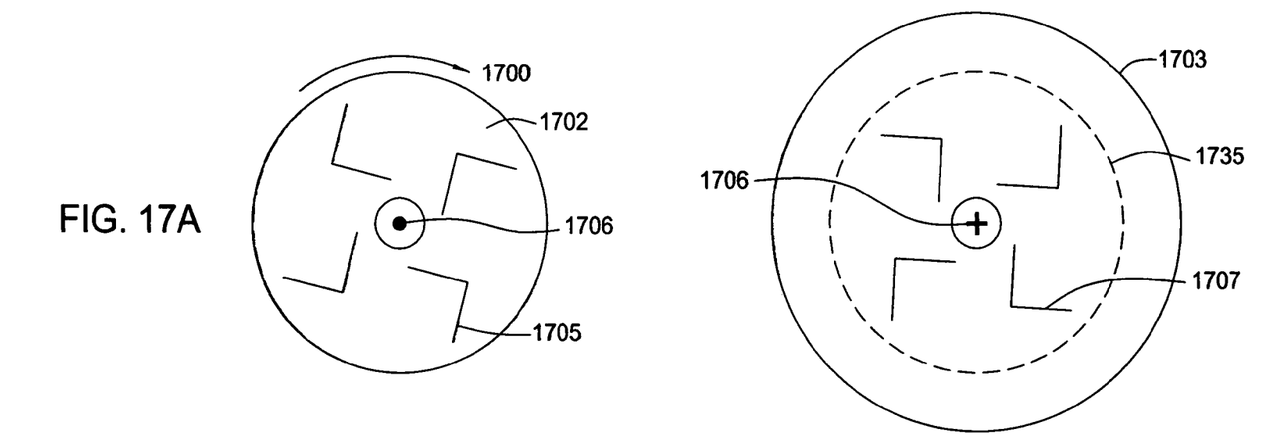
FIGS. 17A and B illustrate end views of a shaft and a counterplate according to embodiments of the present invention.
Figure 17B:
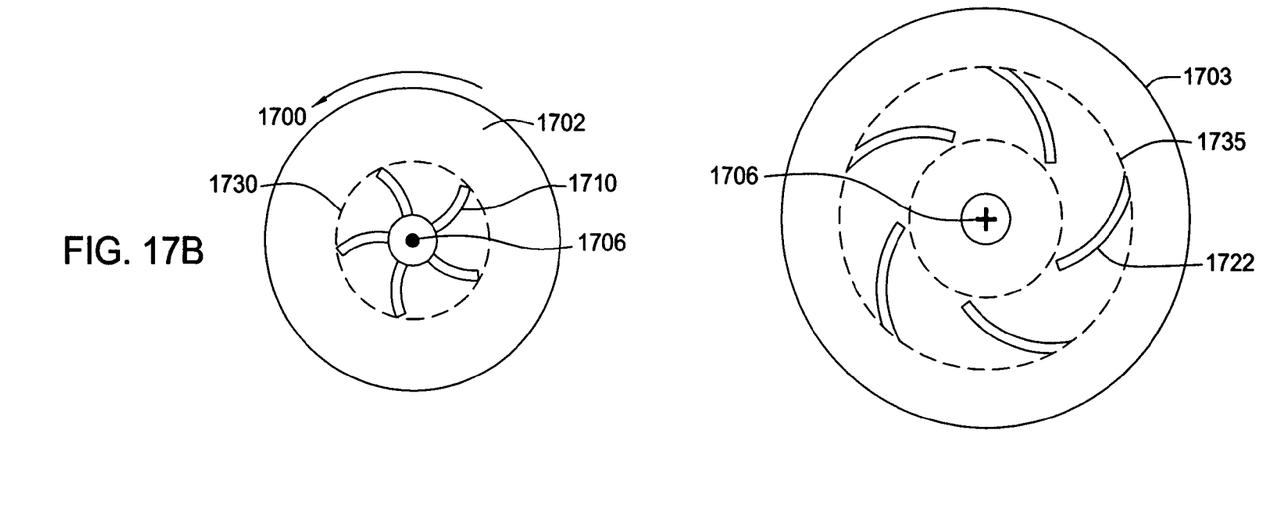

FIGS. 17A and 17B illustrate applications of these principles to thrust bearings. FIGS. 17A and 17B illustrate end views of a shaft or thrust plate 1702 and a counterplate 1703 according to embodiments of the present invention. The shaft or thrust plate 1702 and the counterplate 1703 may represent the end surface 142 of shaft 100 and the facing surface 144 of counterplate 146 in FIG. 1A. The reference line 1735 corresponds to an outside diameter of shaft 1702. The shaft 1702 is configured to rotate in the direction of arrow 1700 above stationary counterplate 1703. However, the teachings of the present invention apply equally to a sleeve rotating above a counterplate. A center axis 1706 is provided. As with the embodiments discussed above, the groove patterns or sets of segments of a single pattern, should be oppositely oriented in rotation to optimize pressure build-up.

In FIG. 17A, sets 1705 and 1707 of chevron grooves are disposed on the shaft 1702 and counterplate 1703, respectively. Alternatively, a spiral pattern may be employed instead of the sets 1705 and 1707 of chevron grooves. As discussed above, each of the sets 1705 and 1707 are oriented relative to the direction of movement (actual and/or relative).

In FIG. 17B, a set 1710 of grooves is disposed on the shaft 1702 (or thrust plate) and a set 1722 of grooves is disposed on the counterplate 1703. The set 1710 of grooves corresponds to the set 1504 (see FIG. 15) of grooves and the set 1722 corresponds to the set 1520 of grooves. The boundary 1730 corresponds to the boundary 1530. As discussed above, each of the sets 1710 and 1722 is oriented relative to the direction of movement (actual and/or relative). Alternatively, a set of groves corresponding to set 1520 may be disposed on the shaft 1702 and a set corresponding to set 1504 may be disposed on the counterplate 1703. As a second alternative, a set corresponding to the set 1520 may also be disposed on the shaft along with set 1710 and a set corresponding to set 1504 may also be disposed on counterplate 1703 along with set 1722.

Disposing grooves on both surfaces defining journal bearings (FIGS. 16A-16C) and/or thrust bearings (FIGS. 17A-B) is advantageous in that more grooved surface area is provided than with conventional designs where only one of the surfaces is grooved. This in turn allows a greater volume of fluid to be pumped or compressed within each groove thereby generating a higher dynamic pressure within the bearing. Greater bearing performance results from the increased dynamic pressure. This may especially be useful in smaller motors where the space for grooving is limited.

While the foregoing is directed to embodiments of the invention, other and further embodiments of the invention may be devised without departing from the basic scope thereof, and the scope thereof is determined by the claims that follow.

What is claimed is:

1. A fluid dynamic bearing, comprising:
a first surface having at least a first groove pattern; and
a second surface having at least a second groove pattern; wherein one of the surfaces is configured to be rotated relative to the other surface and the first and second groove patterns are located on their respective surfaces to cooperate in rotation to establish a pressure to support the relative rotation of the surfaces; wherein the first groove pattern and the second groove pattern are oppositely oriented in the context of relative rotation; wherein during rotation the first groove pattern creates a bearing pressure change at the first groove pattern, and the second groove pattern creates a bearing pressure change at the second groove pattern; wherein the first groove pattern comprises at least one set of first groove segments and the second groove pattern comprises at least one set of second groove segments; wherein each of the surfaces is a substantially flat surface, wherein the first segment extends radially from at or near an inner diameter of the first surface to at or near a portion of a radius of the first surface, and wherein the second segment extends radially from at or near a radial portion of the second surface corresponding to the radius of the first surface to at or near an outer diameter of the second surface.

2. The fluid dynamic bearing of claim 1, wherein each groove pattern comprises a plurality of substantially spiral shaped grooves.

3. The fluid dynamic bearing of claim 1, wherein each groove pattern comprises a plurality of substantially chevron shaped grooves.

4. The fluid dynamic bearing of claim 1, wherein each segment has a constant groove angle along at least part of the length of the segment.

5. The fluid dynamic bearing of claim 1, wherein each segment has a continuously varying groove angle along at least part of the length of the segment.

6. The fluid dynamic bearing of claim 1, wherein the first segment and the second segment overlap along the direction of rotation.

7. The fluid dynamic bearing of claim 1, wherein the first segment and the second segment are spatially separated along the axis of rotation.

8. The fluid dynamic bearing of claim 1, wherein the first segment has a constant groove angle along at least part of the length of the first segment and the second segment has a continuously varying groove angle along at least part of the length of the second segment.

9. A fluid dynamic bearing comprising:
a first surface having at least a first groove pattern; and
a second surface having at least a second groove pattern; wherein one of the first surface and the second surface is configured to be rotated relative to the other surface; wherein the first groove pattern and the second groove pattern cooperate in rotation to establish a pressure to support the relative rotation of the surfaces; wherein each groove pattern comprises at least one first segment and at least one second segment, the first segment being offset along a direction of rotation relative to the second segment; wherein the first segment and the second segment are interrupted so that they are not continuous; and wherein during rotation the first groove pattern creates a bearing pressure change at the first groove pattern and the second groove pattern creates a bearing pressure change at the second groove pattern.

10. The fluid dynamic bearing of claim 9, wherein the segments of each groove pattern have constant groove angles along at least part of the length of each segment.

11. The fluid dynamic bearing of claim 9, wherein the segments of each groove pattern have a continuously varying groove angle along at least part of the length of each segment.

12. The fluid dynamic bearing of claim 9, wherein each groove pattern comprises a first set of segments and a second set of segments and the segments of the groove patterns have an offset δ in the direction of rotation, where $0 < \delta \leq 0.5*pitch$.

13. The fluid dynamic bearing of claim 9, wherein the first segment of each groove pattern has a constant groove angle along at least part of the length of the first segment and the second segment of each groove pattern has a continuously varying groove angle along at least part of the length of the second segment.

14. The fluid dynamic bearing of claim 9, wherein the segments of each groove pattern overlap along the direction of rotation.

15. The fluid dynamic bearing of claim 9, wherein the segments of each groove pattern are spatially separated along the axis of rotation.

16. The fluid dynamic bearing of claim 9, wherein the first groove pattern and the second groove pattern are oppositely oriented in the context of relative rotation.

17. A fluid dynamic bearing comprising:
a first surface having at least a first groove pattern; and
a second surface having at least a second groove pattern;
wherein one of the surfaces is configured to be rotated relative to the other surface, and the first and second groove patterns are located on their respective surfaces to cooperate in rotation to establish a pressure to support the relative rotation of the surfaces; wherein each of the surfaces is a substantially flat surface; wherein the first groove pattern extends radially from at or near an inner diameter of the first surface to at or near a portion of a radius of the first surface; and wherein the second groove pattern extends radially from at or near a radial portion of the second surface corresponding to the radius of the first surface to at or near an outer diameter of the second surface.

* * * * *